US010111296B2

United States Patent
Wu et al.

(10) Patent No.: US 10,111,296 B2
(45) Date of Patent: Oct. 23, 2018

(54) SYSTEMS, DEVICES, AND METHODS FOR CALIBRATING LEDS

(71) Applicant: GOOGLE LLC, Mountain View, CA (US)

(72) Inventors: Honglei Wu, South San Francisco, CA (US); Cornelius O'Sullivan, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 15/717,751

(22) Filed: Sep. 27, 2017

(65) Prior Publication Data

US 2018/0098401 A1    Apr. 5, 2018

Related U.S. Application Data

(60) Provisional application No. 62/403,639, filed on Oct. 3, 2016.

(51) Int. Cl.
| | | |
|---|---|---|
| *H05B 33/08* | (2006.01) | |
| *H05B 37/02* | (2006.01) | |
| *G10L 15/22* | (2006.01) | |
| *H04R 1/02* | (2006.01) | |

(52) U.S. Cl.
CPC ..... *H05B 33/0869* (2013.01); *H05B 33/0851* (2013.01); *H05B 37/0236* (2013.01); *G10L 15/22* (2013.01); *G10L 2015/223* (2013.01); *H04R 1/028* (2013.01)

(58) Field of Classification Search
None
See application file for complete search history.

(56) References Cited

U.S. PATENT DOCUMENTS

| | | | | |
|---|---|---|---|---|
| 2012/0319592 | A1* | 12/2012 | Riesebosch | H05B 33/0851 |
| | | | | 315/152 |
| 2013/0320862 | A1* | 12/2013 | Campbell | H05B 37/02 |
| | | | | 315/152 |
| 2014/0265882 | A1* | 9/2014 | Laski | H05B 33/0854 |
| | | | | 315/158 |
| 2015/0310794 | A1* | 10/2015 | Gille | H04N 9/73 |
| | | | | 345/594 |

* cited by examiner

*Primary Examiner* — Dedei K Hammond
(74) *Attorney, Agent, or Firm* — Morgan, Lewis & Bockius LLP

(57) ABSTRACT

The various implementations described herein include methods, devices, and systems for calibrating LED(s). In one aspect, a method includes: (1) obtaining a desired color value for each LED of a plurality of LEDs to be calibrated; (2) obtaining image information from an image sensor, the image information corresponding to operation of the plurality of LEDs; and (3) generating calibration information for each LED of the plurality of LEDs based on the desired color value for the LED and the obtained image information.

18 Claims, 8 Drawing Sheets
(2 of 8 Drawing Sheet(s) Filed in Color)

SYSTEMS, DEVICES, AND METHODS FOR CALIBRATING LEDS

RELATED APPLICATIONS

This application claims priority to U.S. Provisional Patent Application No. 62/403,639, filed Oct. 3, 2016, entitled "Systems, Devices, and Methods for Calibrating LEDs," which is hereby incorporated by reference in its entirety.

TECHNICAL FIELD

This application relates generally to illumination devices, including but not limited to methods and systems for calibrating color light emitting diodes (LEDs).

BACKGROUND

LEDs, if not calibrated, come with large amount of variation in brightness and color. To achieve better uniformity in brightness and color, LED manufacturers often employ a process called "binning." In the binning process, LEDs of similar brightness and color are "binned" together. The LED manufactures often put LEDs of the same bin into the same reel to facilitate manufacturing requirements of brightness and color uniformity. The variance within the same bin of LEDs depends on a number of parameters such as price, available production volume, and etcetera. Usually, at reasonable cost, each bin is binned to an accuracy of about 15% for green (the color to which the human eye is most sensitive) and 50-100% for blue (the colors to which the human eye is less sensitive), and a buyer is usually required to purchase multiple bins. However, even if binned LEDs are used, the resulting worst case color variation is still unacceptable when distinctive or specific colors are required.

SUMMARY

Accordingly, there is a need for systems and/or devices with more efficient, precise, accurate, and cost-effective methods for configuring LEDs for consistent color and/or brightness. Such systems, devices, and methods optionally complement or replace conventional systems, devices, and methods for configuring LEDs.

The conventional method of binning is a brute-force methodology; it can be effective but is also costly. The cost lies in the overhead of selecting the LEDs and the resulting more complex inventory management. The disclosed implementations include a LED calibrating methodology. The disclosed implementations do not rely on brute-force techniques such as binning but instead analyze variations in color and/or brightness of individual LEDs (including LEDs with wide variations in brightness and/or color) and then calculate correction factors needed to eliminate the variations altogether for those individual LEDs. The correction factors can be saved and then used to program/configure LED drivers to provide consistent color and/or brightness of light output from respective individual LEDs during use. As a result, in applications where consistency of LEDs is important (e.g., in an electronic device including a group of LEDs that are required to provide illumination with specific color component values), the disclosed implementations can provide such consistency using a combination of LEDs with inherent color and/or brightness variations by applying the individual correction factors during use to correct for those individual variations.

Advantages of solving the problem using the disclosed implementations include improving the quality consistency of LEDs and cost savings that result from correcting inherent variations in LEDs without labor-intensive processes, such as binning. The disclosed implementations improve LED color and brightness uniformity. The disclosed implementations also allow for the use of cheaper LED components to achieve the illumination uniformity associated with more expensive LED. All products with LED lighting can benefit from the disclosed calibrating methodology, including LED displays, OLED displays and the like.

The various implementations described herein include methods, devices, and systems for calibrating LED(s). In one aspect, a method includes: (1) obtaining a desired color value for each LED of a plurality of LEDs to be calibrated; (2) obtaining image information from an image sensor, the image information corresponding to operation of the plurality of LEDs; and (3) generating calibration information for each LED of the plurality of LEDs based on the desired color value for the LED and the obtained image information.

Thus, devices and systems are provided with methods for configuring LEDs, thereby increasing the effectiveness, efficiency, accuracy, precision, and user satisfaction with such systems. Such methods may complement or replace conventional methods for configuring LEDs.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a better understanding of the various described implementations, reference should be made to the Description of Implementations below, in conjunction with the following drawings in which like reference numerals refer to corresponding parts throughout the figures.

Like reference numerals refer to corresponding parts throughout the several views of the drawings.

DESCRIPTION OF IMPLEMENTATIONS

Light emitting diodes (LEDs) come with large variations in color and brightness (e.g., variations noticeable to the human eye). Some electronic devices include components that use LEDs to provide illumination or to display information. For example, in the Google Home voice-activated electronic device the LED components include 12 full color LEDs that are selectively illuminated to show different kinds of animations during user interactions that are used to indicate the voice processing state of the Google Home device and the back end user assistant for which it is the front end, and of the user interactions. In some operating conditions, these LED illumination components are expected to display Google brand colors and thus it is important from a branding point of view to keep the color consistent across all units and within individual pixels of particular unites. However, given the high level of variations in color and brightness of un-binned LEDs (e.g., some LEDs will appear more red than others, some LEDs will appear more blue than others etc.) may affect consumers' perception of the Google brand colors or the quality of the Google Home product. For example, if the Google brand colors appear too inconsistent across units, then the brand message may lose its clarity.

In accordance with some implementations, an electronic device includes an array of full color light emitting diodes, each of which comprises three individually controllable LEDs, each of which provides illumination for corresponding color space components, such as Red, Green and Blue color components. As is well known, the color perceived by a user resulting from illumination of an individual full color LED is determined largely by the combination of the individual color values of the three component LEDs. While the electronic device processes inputs, the array of full LEDs is illuminated to provide a visual pattern according to LED illumination specifications determined according to a state of the processing. The array of full color LEDs is configured to provide a plurality of visual patterns each corresponding to a processing state. The LED design language used to create the visual patterns is applied to at least partially resolve the problem of user confusion, apprehension, and uneasiness and promote understanding, adoption and enjoyment of the corresponding interface experience. Therefore it is important to ensure that the LEDs have consistent color and brightness lest important information being conveyed by the LED indicators on the device be misrepresented, or misconstrued by a user.

Figure 1A:
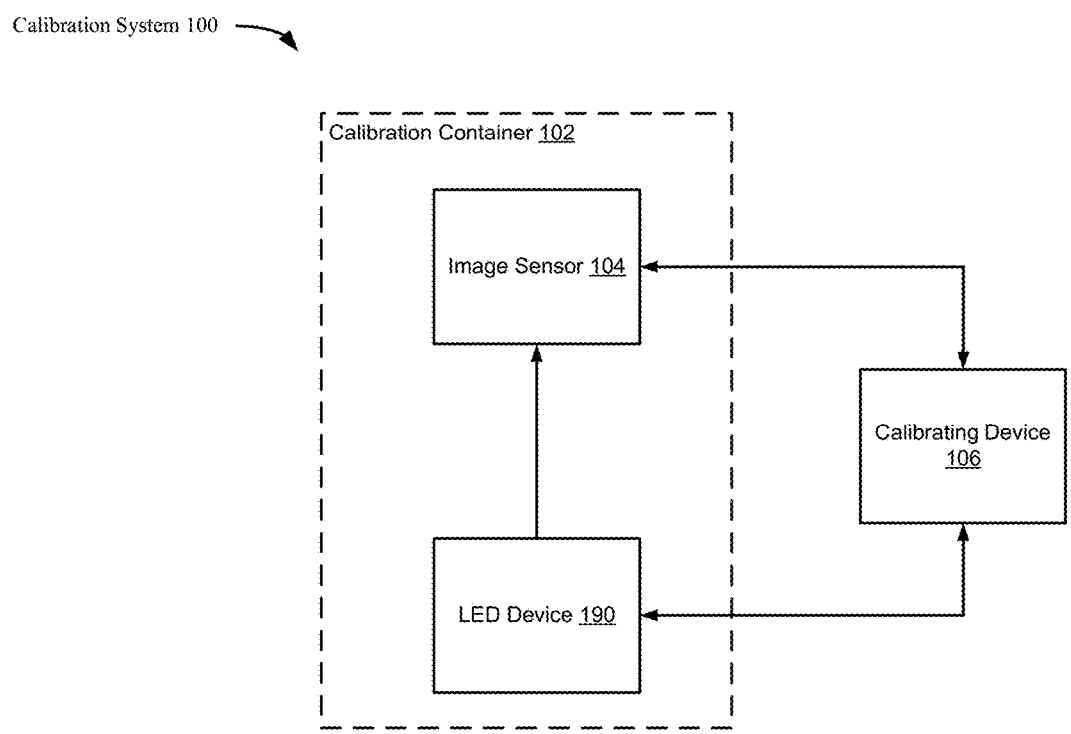
FIG. 1A shows diagram of a representative LED calibration system in accordance with some implementations.

FIG. 1A shows a diagram of an LED calibration system 100 in accordance with some implementations. In some implementations, the calibration system is 100 utilized to calibrate the LEDs of one or more LED devices. In some implementations, the calibration system calibrates (also sometimes called tuning or configuring) the LEDs individually on each LED device. In some implementations, the LEDs are calibrated prior to being installed in a device— e.g., after being mounted on a PCB but prior to that PCB being mounted in a device during a manufacturing operation. In some implementations, the tuning system includes: (1) a calibration container 102 with a dark interior configured to block all outside light from entering the container; (2) an image sensor 104 (e.g., camera) mounted inside the container 102; and (3) a calibrating device 106 (e.g., a laptop) coupled to the image sensor 104 and the LED device 190 being calibrated and configured to determine calibration parameters for the LED device 190. In some implementations, the calibration system 100 is configured to calibrate a plurality of LED devices 190 concurrently. In some implementations, the LED device consists of one or more LEDs and storage for storing the calibration parameters. In some implementations, the LED device comprises an LED module configured In some implementations, the calibrating device 106 includes memory storing one or more programs, which contain instructions to extract LED variation data and calculate the calibration parameters. In some implementations, reading pictures and calculating calibration parameters is automated.

In some implementations, the LED device (e.g., device 190) includes memory for storing the calibration data (e.g., LED configuration data 336). In some implementations, the LED device includes an LED controller (e.g., LED control module 324) configured to utilize the calibration data to make the LEDs uniform in both color and brightness during illumination of the LEDs (either as a group or individually).

In some implementations, inside the calibration container 102, the image sensor 104 takes a series of pictures of the LEDs on the LED device being calibrated. The resulting images are then analyzed by the calibrating device 106. The calibrating device 106 analyzes each LED's color and brightness and sends correction values to the LED device for each LED. The result is that all the LEDs have more consistent color and brightness (e.g., less than a particular threshold in variation). In some implementations, the calibrating device 106 calibrates the LEDs such that the color and brightness of each LED is within a particular threshold of the desired values (e.g., within 2%, 5%, or 10% of a specific color value). For implementations where the LEDs are full color, the image sensor evaluates component values of each LED. For example, when the electronic device includes a ring of 12 LEDs, the image sensor evaluates the individual Red, Green and Blue component values of each of the 12 LEDs.

In some implementations, the image sensor 104 comprises a camera. In some implementations, picture acquisition from the camera is completely automated. In some implementations, transferring the pictures from the camera to the calibrating device 106 is automatic, while in other implementations, transferring the pictures to the calibrating device 106 is manual. In some implementations, the image sensor 104 comprises a color meter coupled with optical fiber. The data for the individual LED color/brightness variation is collected by using the optical fiber and color meter.

Figure 1C:
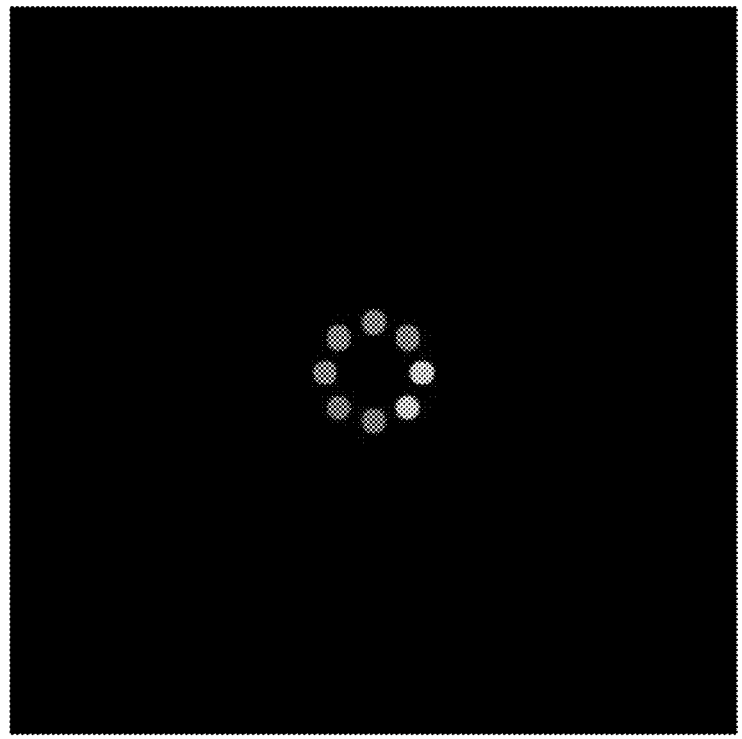
FIGS. 1B and 1C show prophetic LED colors before and after calibration respectively, in accordance with some implementations.
Figure 1B:
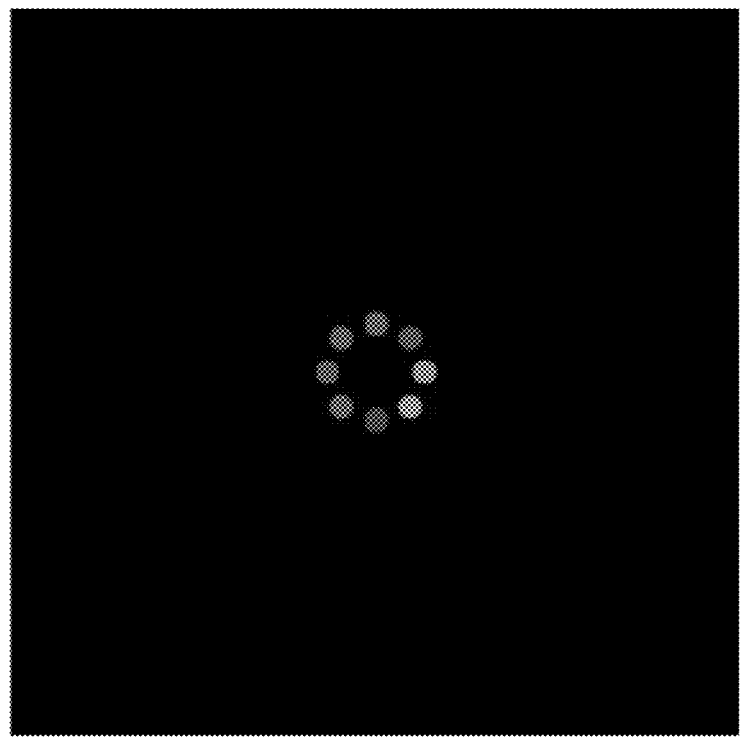

FIGS. 1B and 1C show prophetic LED colors before and after calibration respectively, in accordance with some implementations. In FIG. 1B the two "red" LEDs are noticeably different from one another, likewise with the "blue" LEDs, "green" LEDs, and "yellow" LEDs. In FIG. 1C the "red," "blue," "green," and "yellow" LEDs are uniform in color as a result of the disclosed calibrating methodologies.

Figure 1D:
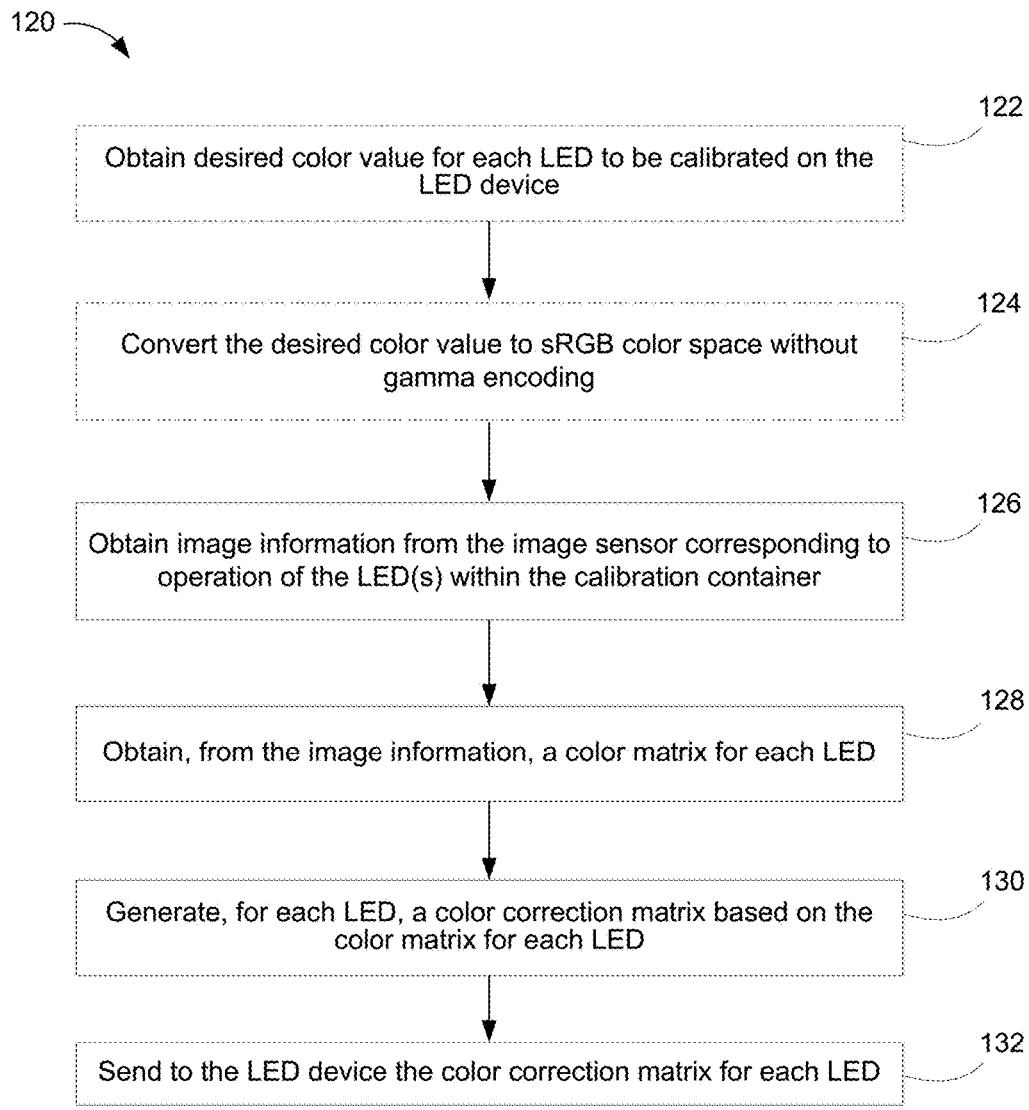
FIG. 1D is a flow diagram illustrating a method of calibrating an LED device in accordance with some implementations.

FIG. 1D is a flow diagram illustrating a method 120 of calibrating an LED device in accordance with some implementations. In some implementations, the method 120 is performed by a calibrating device 106 (FIG. 5) or a component thereof, such as a LED calibration module 518. In some implementations, the operations of the method 120 described herein are entirely interchangeable, and respective operations of the method 120 are performed by any of the aforementioned devices, systems, or combination of devices and/or systems. In some embodiments, method 120 is governed by instructions that are stored in a non-transitory computer-readable storage medium and that are executed by one or more processors of a device/computing system, such as the one or more CPU(s) 502 of calibrating device 106. For convenience, method 120 will be described below as being performed by the calibrating device 106.

In some implementations, the calibrating device 106 obtains (122) desired color values for each LED to be calibrated. For example, the calibrating device 106 obtains the desired color values from a color designer or from a product specification.

In some implementations, the calibrating device 106 converts (124) the desired color value to a color space (e.g., to an sRGB color space without gamma encoding). In some instances, the desired color values comprise non-linear RGB values. In some implementations, the non-linear RGB values are converted to linear RGB values utilizing equation 1 below.

$$\text{De-Gamma of } RGB \text{ values} \quad \text{Equation 1}$$

$$\begin{pmatrix} R_{sRGB} \\ G_{sRGB} \\ B_{sRGB} \end{pmatrix} \xrightarrow{De\text{-}Gamma} \begin{pmatrix} R_{sRGB,linear} \\ G_{sRGB,linear} \\ B_{sRGB,linear} \end{pmatrix}$$

In the above equation, the sRGB subscript refers to RGB values specified in sRGB color space with gamma encoding. The sRGB,linear subscript refers to RGB values specified in sRGB color space without the gamma encoding. In some implementations, the de-gamma process utilizes a look-up table (e.g., a 256-value look-up table).

The calibrating device 106 obtains (126) image information (e.g., a picture) from the image sensor 104 corresponding to operation of the LED(s) within the calibration container. In some implementations, the calibrating device 106 obtains a picture of the operating LEDs from the image sensor 104. In some implementations, the image information corresponds to operation of the LEDs within a housing of the LED device. Therefore the calibration of the LEDs includes calibrating for potential variances caused by the LEDs' light passing through the housing. In some implementations, the calibrating device 106 obtains image information for each color component of the full color LED's. For example, the calibrating device 106 obtains a first picture capturing the red component of the LED (e.g., a picture taken when only the red component is active), obtains a second picture capturing the blue component of the LED, and obtains a third picture capturing the green component of the LED. In some implementations, the calibrating device 106 extracts the image information of each color component from a single picture (e.g., a picture taken when all color components are active).

The calibrating device 106 obtains (128), from the image information, a color matrix for each LED to be calibrated. In some implementations, the color matrix is obtained in the color space of the image sensor 104. For example, the image sensor 104 comprises a 1931 XYZ camera and the color matrix is in the XYZ color space. In some implementations, obtaining the image information from the image sensor includes obtaining one or more pictures from the image sensor. In some implementations, the calibrating device selects an optimal picture from the one or more obtained pictures.

The calibrating device 106 generates (130), for each LED, a color correction matrix (CCM) based on the color matrix for the LED. In some implementations, generating a color correction matrix includes generating an offset matrix in the color space of the image sensor 104. In some implementations, generating a color correction matrix includes utilizing equation 2 below.

$$\text{Color Correction Matrix} \quad \text{Equation 2}$$

$$INVERT\left(\begin{pmatrix} X_{RLED'} & X_{GLED'} & X_{BLED'} \\ Y_{RLED'} & Y_{GLED'} & Y_{BLED'} \\ Z_{RLED'} & Z_{GLED'} & Z_{BLED'} \end{pmatrix}\right) \times$$

$$\begin{pmatrix} X_{RsRGB'} & X_{GsRGB'} & X_{BsRGB'} \\ Y_{RsRGB'} & Y_{GsRGB'} & Y_{BsRGB'} \\ Z_{RsRGB'} & Z_{GsRGB'} & Z_{BsRGB'} \end{pmatrix} = \begin{pmatrix} C_{11} & C_{12} & C_{13} \\ C_{21} & C_{22} & C_{23} \\ C_{31} & C_{32} & C_{33} \end{pmatrix}$$

In the above equation, INVERT( ) refers to the operation of inverting a matrix. [X, Y, Z] refers to the particular color components specified in the color space; LED' refers to the color space of the image sensor; and sRGB' refers to the sRGB color space.

In some implementations, the calibrating device scales the CCM to prevent overrange (also sometimes called clipping) of the RGB values for the LED. Scaling the CCM ensures that the resulting RGB values are within the operating range of the LED.

The calibrating device 106 sends (132) the color correction matrix for each LED to the LED device. In some implementations, the calibrating device 106 sends the CCM to the LED device via a USB port on the LED device. In some implementations, the calibrating device 106 sends one or more brightness parameters for each LED to the LED device.

In some implementations, the LED device stores the CCM for future operation of the LEDs (e.g., LED configuration data 336). In some implementations, the LED device stores the one or more brightness parameters for each LED for future operation of the LEDs (e.g., LED configuration data 336). In some implementations, the LED device utilizes the CCM to adjust the operation of the individual LEDs. For example, in accordance with some implementations, the LED device utilizes equation 3, below, to adjust the LEDs.

$$\text{Adjusting } LED \text{ output} \quad \text{Equation 3}$$

$$\begin{pmatrix} C_{11} & C_{12} & C_{13} \\ C_{21} & C_{22} & C_{23} \\ C_{31} & C_{32} & C_{33} \end{pmatrix} \times \begin{pmatrix} R_{sRGB,linear} \\ G_{sRGB,linear} \\ B_{sRGB,linear} \end{pmatrix} = \begin{pmatrix} R_{LED} \\ G_{LED} \\ B_{LED} \end{pmatrix}$$

In the above equation, the CCM is applied to the target RGB values (specified in sRGB color space without the gamma encoding) to produce modified target values. The modified target values correct for variances between LEDs.

In some implementations, the calibrating device 106 sends commands to the LED device to be calibrated (e.g., to enable LEDs). In some implementations, the calibrating device 106 sends commands to the image sensor (e.g., to capture image data). In some implementations, the calibrating device 106 analyzes the image data received from the image sensor. In some implementations, the calibrating device 106 detects a dot of light for each LED to be calibrated and calculates the RGB values of each dot of light. In some implementations, the calibrating device 106 calculates an LED brightness adjustment for each LED. In some implementations, the calibrating device 106 calculates a color correction matrix for each LED. In some implementations, the calibrating device 106 sends the LED brightness adjustments and color correction matrices to the LED device.

In some implementations, prior to calibrating the LEDs, the calibrating device 106 obtains one or more pictures from the image sensor to verify or adjust the exposure level of the image sensor.

In some implementations, prior to obtaining the color matrices, the calibrating device 106 obtains one or more pictures from the image sensor and calibrates the LED(s) brightness based on the one or more pictures.

In some implementations, after sending the CCM(s) to the LED device, the calibrating device 106 obtains one or more pictures from the image sensor to verify that the corrected LED outputs (e.g., the outputs after applying the CCM(s)) are accurate (e.g., within a threshold distance of the desired values, such as 2%, 5%, or 10%).

It should be understood that the particular order in which the operations in FIG. 1D have been described is merely an example and is not intended to indicate that the described order is the only order in which the operations could be performed. For example, in some implementations, operations 122 and 124 are performed after operation 132. One of ordinary skill in the art would recognize various ways to reorder the operations described herein. Additionally, it should be noted that details of other processes described herein with respect to other methods and/or processes described herein are also applicable in an analogous manner to the method 120 described above with respect to FIG. 1D.

Figure 2B:
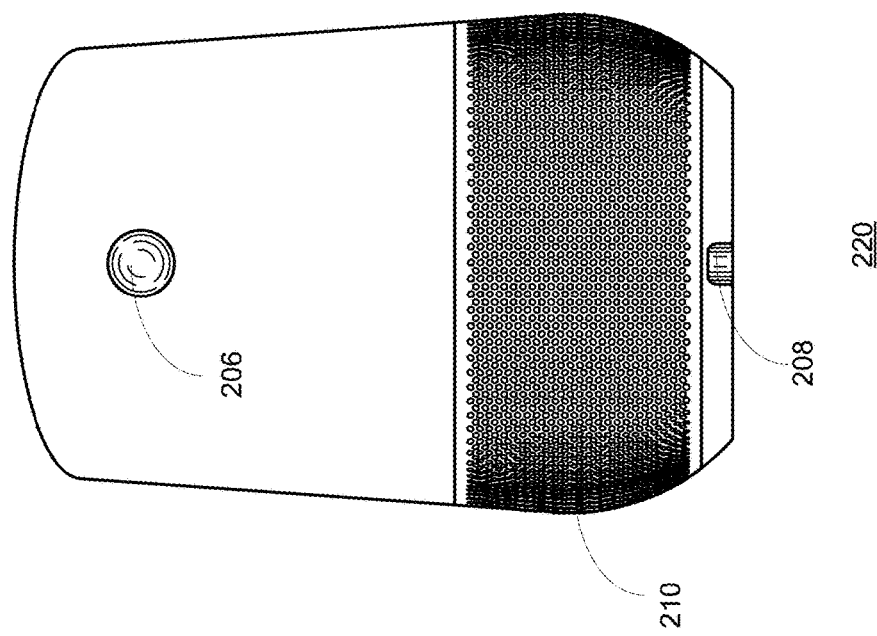
FIGS. 2A and 2B are a front view and a rear view of a voice-activated electronic device in accordance with some implementations.
Figure 2A:
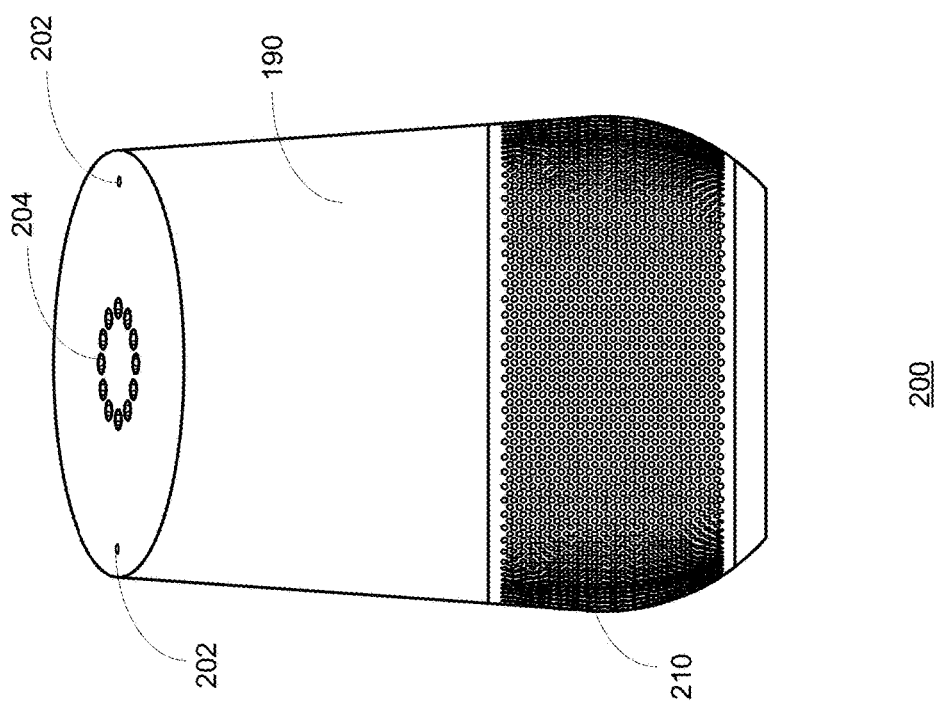

FIGS. 2A and 2B are a front view 200 and a rear view 220 of a voice-activated electronic device 190 in accordance with some implementations. The electronic device 190 is designed as warm and inviting, and fits naturally in many areas of a home. The electronic device 190 includes one or more microphones 202 and an array of full color LEDs 204. In some implementations, the full color LEDs 204 are located under a top surface of the electronic device 190 and invisible to the user when they are not lit. In some implementations, the array of full color LEDs 204 is physically arranged in a ring. Further, the rear side of the electronic device 190 optionally includes a power supply connector 208 configured to couple to a power supply. In some implementations, the full color LED comprises an LED with RGB components, capable of displaying a plurality of colors.

In some implementations, the electronic device 190 presents a clean look having no visible button, and the interaction with the electronic device 190 is based on voice and touch gestures. Alternatively, in some implementations, the electronic device 190 includes a limited number of physical buttons (e.g., a button 206 on its rear side), and the interaction with the electronic device 190 is further based on interaction with the physical buttons. In some implementations, one or more speakers are disposed in the electronic device 190.

In some implementations, the electronic device 190 includes an array of full color LEDs 204, one or more microphones 202, a speaker 222, Dual-band WiFi 802.11ac radio(s), a Bluetooth LE radio, an ambient light sensor, a USB port, a processor and memory storing at least one program for execution by the processor.

Further, in some implementations, the electronic device 190 further includes a touch sense array 224 configured to detect touch events on the top surface of the electronic device 190. The touch sense array 224 is disposed and concealed under the top surface of the electronic device 190. In some implementations, the touch sense array 224 arranged on a top surface of a circuit board including an array of via holes, and the full color LEDs are disposed within the via holes of the circuit board. When the circuit board is positioned immediately under the top surface of the electronic device 190, both the full color LEDs 204 and the touch sense array 224 are disposed immediately under the top surface of the electronic device 190 as well.

In some implementations, given the simplicity and low cost of the electronic device 190, the electronic device 190 includes an array of full color light emitting diodes (LEDs) rather than a full display screen. An LED design language is adopted to configure illumination of the array of full color LEDs and enable different visual patterns indicating different processing states of the electronic device 190. The LED design language includes a grammar of colors, patterns, and specific motion applied to a fixed set of full color LEDs. The elements in the language are combined to visually indicate specific device states during the use of the electronic device 190. In some implementations, illumination of the full color LEDs delineates the passive listening and active listening states of the electronic device 190 among other important states. In some implementations, the array of full color LEDs is used in a speaker that is made by a third party original equipment manufacturer (OEM) based on specific technology (e.g., Google Assistant).

When the array of full color LEDs is used in a speaker that is made by a third party OEM based on specific technology, the full color LEDs and the LED design language are configured to fit a corresponding physical user interface of the OEM speaker. In this situation, device states of the OEM speaker remain the same, while specific visual patterns representing the device states are varied. For example, the colors of the full color LEDs are different but are displayed with similar animation effects.

In a voice-activated electronic device 190, passive listening occurs when the electronic device 190 processes audio inputs collected from its surrounding environment but does not store the audio inputs or transmit the audio inputs to any remote server. In contrast, active listening occurs when the electronic device 190 stores the audio inputs collected from its surrounding environment and/or shares the audio inputs with a remote server. In accordance with some implementations of this application, the electronic device 190 only passively listens to the audio inputs in its surrounding environment without breaching privacy of users of the electronic device 190.

Figure 2C:
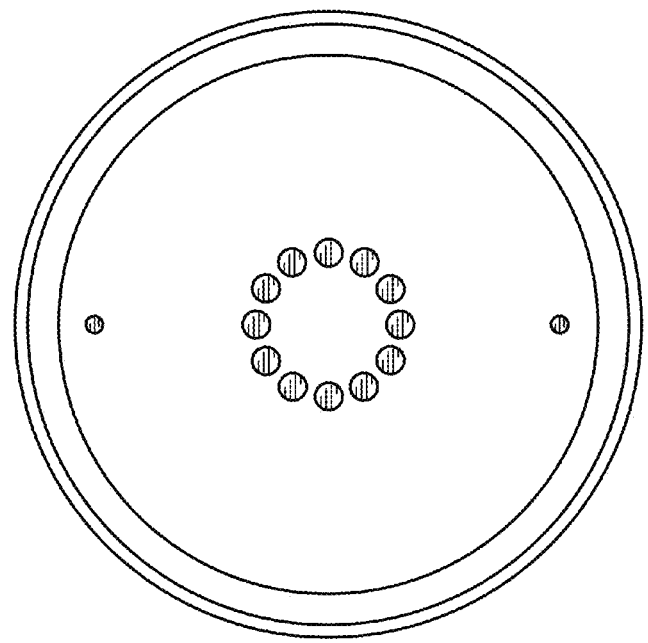
FIG. 2C is a top view of a voice-activated electronic device in accordance with some implementations.
Figure 2D:
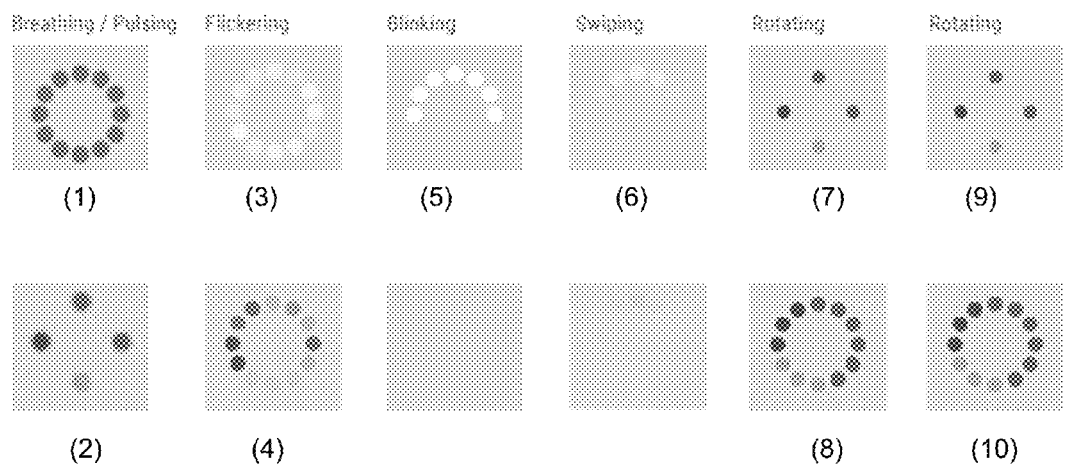
FIG. 2D shows six visual patterns displayed by an array of full color LEDs for indicating voice processing states in accordance with some implementations.

FIG. 2C is a top view of a voice-activated electronic device 190 in accordance with some implementations, and FIG. 2D shows six visual patterns displayed by an array of full color LEDs for indicating voice processing states in accordance with some implementations. In some implementations, the electronic device 190 does not include any display screen, and the full color LEDs provide a simple and low cost visual user interface compared with the a full display screen. The full color LEDs could be hidden under a top surface of the electronic device and invisible to the user when they are not lit. Referring to FIGS. 2C and 2D, in some implementations, the array of full color LEDs are physically arranged in a ring.

Specifically, a method is implemented at the electronic device 190 for visually indicating a processing state. The electronic device 190 collects via the one more microphones audio inputs from an environment in proximity to the electronic device, and processes the audio inputs. The processing includes one or more of identifying and responding to voice inputs from a user in the environment. The electronic device 190 determines a state of the processing from among a plurality of predefined voice processing states. For each of the full color LEDs, the electronic device 190 identifies a respective predetermined LED illumination specification associated with the determined voice processing state. The illumination specification includes one or more of an LED illumination duration, pulse rate, duty cycle, color sequence and brightness. In some implementations, the electronic device 190 determines that the voice processing state is associated with one of a plurality of users, and identifies the predetermined LED illumination specifications of the full color LEDs by customizing at least one of the predetermined LED illumination specifications (e.g., the color sequence) of the full color LEDs according to an identity of the one of the plurality of users.

Further, in some implementations, in accordance with the determined voice processing state, the colors of the full color LEDs include a predetermined set of colors. For example, referring to FIGS. 2D(2), 2D(2) and 2D(7)-(10), the predetermined set of colors include Google brand colors including blue, green, yellow and red, and the array of full color LEDs is divided into four quadrants each associated with one of the Google brand colors.

In accordance with the identified LED illumination specifications of the full color LEDs, the electronic device 190 synchronizes illumination of the array of full color LEDs to provide a visual pattern indicating the determined voice processing state. In some implementations, the visual pattern indicating the voice processing state includes a plurality of discrete LED illumination pixels. In some implementations, the visual pattern includes a start segment, a loop segment and a termination segment. The loop segment lasts for a length of time associated with the LED illumination durations of the full color LEDs and configured to match a length of the voice processing state.

In some implementations, the electronic device 190 has more than twenty different device states (including the plurality of predefined voice processing states) that are represented by the LED Design Language. Optionally, the plurality of predefined voice processing states includes one or more of a hot word detection state, a listening state, a thinking state and a responding state.

Accordingly, in some implementations, in accordance with a determination that the determined voice processing state is a hot word detection state that occurs when one or more predefined hot words are detected, the array of full color LEDs is divided into a plurality of diode groups that are alternately arranged and configured to be lit sequentially, and diodes in each of the plurality of diode groups are lit with different colors. Further, in some implementations, in accordance with a determination that the determined voice processing state is a listening state that occurs when the electronic device is actively receiving the voice inputs from the environment and providing received voice inputs to a remote server, all full color LEDs are lit up with a single color, and each full color LED illuminates with different and varying brightness.

In some implementations, the visual pattern is configured to be consistent with human reactions (e.g., breathing, flickering, blinking, and swiping) associated with the voice processing state. For example, one of the most impactful places to use the Google brand colors, the attentive wake-up spin followed by the gentle breathing animation signals patient, and eager, yet respectful listening. The colors themselves conjure a sense of brand and embodiment of the Google voice assistant. These elements contrast with the dead front of the device to show distinct "not recording" and "recording" states.

In some implementations, in accordance with a determination that the voice processing state is a thinking state that occurs when the electronic device is processing the voice inputs received from the user, an increasing number of RGB diodes are lit up during a first illumination cycle of the LED illumination duration, and a decreasing number of RGB diodes are lit up during a second illumination cycle following the first illumination cycle. Such a visual pattern is consistent with a human reaction that a person is thinking. Optionally, the microphones are turned off in the thinking mode.

Referring to FIGS. 2D(3), 2D(5) and 2D(6), motion most similar to progress bars and other types of digital waiting signals are used in the visual pattern to indicate the thinking mode in some implementations. In accordance with some implementations, white is used with the chasing animation, brand colors are intentionally not used here to provide better distinction contrast and highlighting with respect to the other voice processing states.

In some implementations, in accordance with a determination that the voice processing state is in a responding state that occurs when the electronic device broadcasts a voice message in response to the voice inputs received from the user, a subset of the full color LEDs are lit up with a single color of distinct and varying brightness, and variation of the brightness of each of the subset of the fully color LEDs is consistent with a voice speed associated with the voice inputs from the user. In some implementations, a set of colors (e.g., the Google brand colors) are used in the visual pattern to visually signify closure to the voice query (e.g., that the question has been answered).

Figure 3:
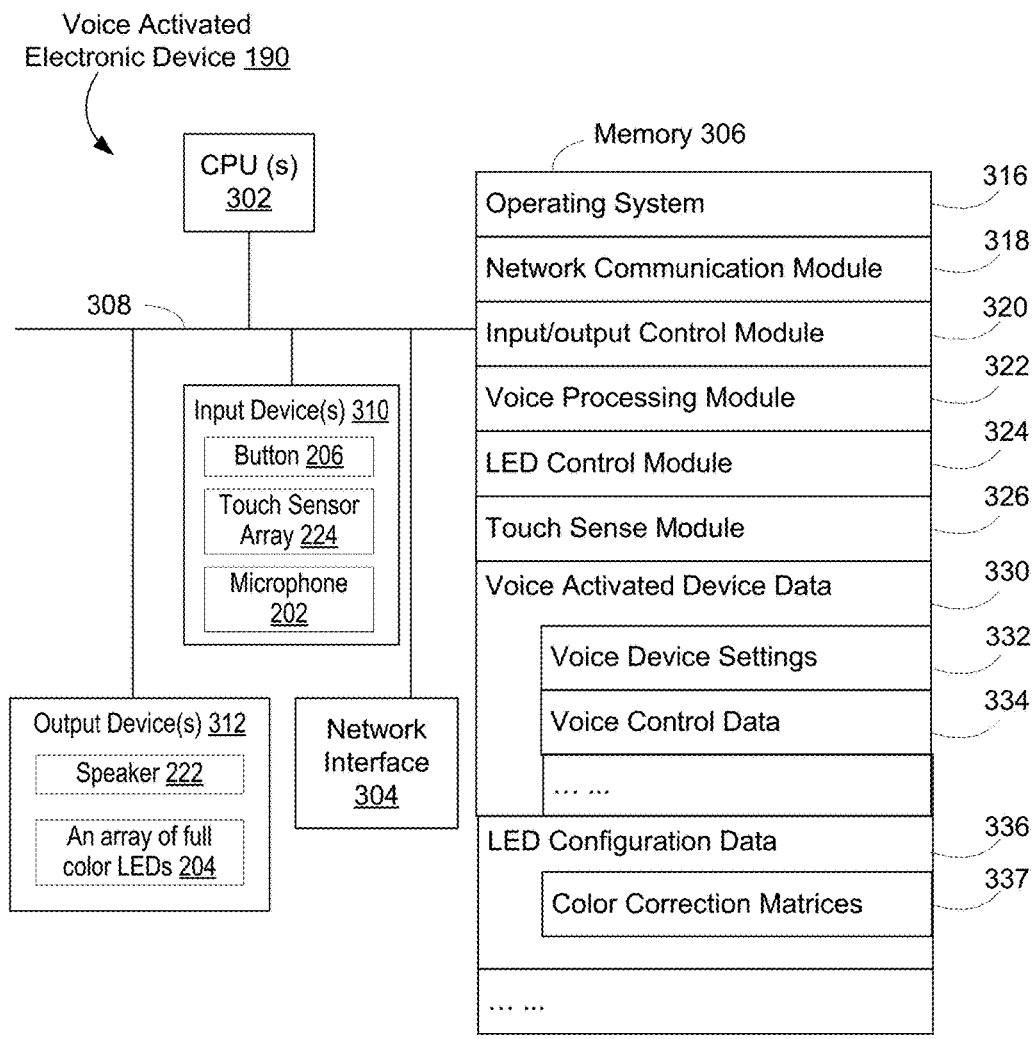
FIG. 3 is a block diagram illustrating an example electronic device utilizing LEDs in accordance with some implementations.

FIG. 3 is a block diagram illustrating an example electronic device 190 that is applied as a voice interface to collect user voice commands in a smart media environment 100 in accordance with some implementations. The electronic device 190, typically, includes one or more processing units (CPUs) 302, one or more network interfaces 304, memory 306, and one or more communication buses 308 for interconnecting these components (sometimes called a chipset). The electronic device 190 includes one or more input devices 310 that facilitate user input, such as the button 206, the touch sense array and the one or more microphones 202 shown in FIGS. 2A-2C. The electronic device 190 also includes one or more output devices 312, including one or more speakers 222 and the array of full color LEDs 204.

Memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 306, optionally, includes one or more storage devices remotely located from one or more processing units 302. Memory 306, or alternatively the non-volatile memory within memory 306, includes a non-transitory computer-readable storage medium. In some implementations, memory 306, or the non-transitory computer-readable storage medium of memory 306, stores the following programs, modules, and data structures, or a subset or superset thereof:

Operating system 316 including procedures for handling various basic system services and for performing hardware dependent tasks;

Network communication module 318 for connecting the electronic device 190 to other devices (e.g., the server system(s), the client device(s), and the like) via one or more network interfaces 304 (wired or wireless) and one or more networks, such as the Internet, other wide area networks, local area networks, metropolitan area networks, and so on;

Input/output control module for receiving inputs via one or more input devices 310 enabling presentation of information at the electronic device 190 via one or more output devices 312, including:

Voice processing module 322 for processing audio inputs or voice messages collected in an environment surrounding the electronic device 190, or preparing the collected audio inputs or voice messages for processing at a voice assistance server or a cloud cast service server;

LED control module 324 for governing operation of the LEDs 204, including generating visual patterns on the LEDs 204 according to device states of the electronic device 190 and applying correction parameters to the LEDs 204 (e.g., adjusting color and/or brightness); and Touch sense module 326 for sensing touch events on a top surface of the electronic device 190;

Voice activated device data 330 storing at least data associated with the electronic device 190, including:

Voice device settings 332 for storing information associated with the electronic device 190 itself, including common device settings (e.g., service tier, device model, storage capacity, processing capabilities, communication capabilities, etc.), information of a user account in a user domain, and display specifications associated with one or more visual patterns displayed by the full color LEDs; and Voice control data 334 for storing audio signals, voice messages, response messages and other data related to voice interface functions of the electronic device 190; and LED configuration data 336 for configuring the various LED parameters, such as brightness and color values, including:

Color correction matrices 337 to enable color and/or brightness of the full color LEDs to be corrected during illumination operations, such as operations related to conveying state of a voice processing operation or of a particular electronic device.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 306, optionally, stores a subset of the modules and data structures identified above. Furthermore, memory 306, optionally, stores additional modules and data structures not described above.

Figure 4:
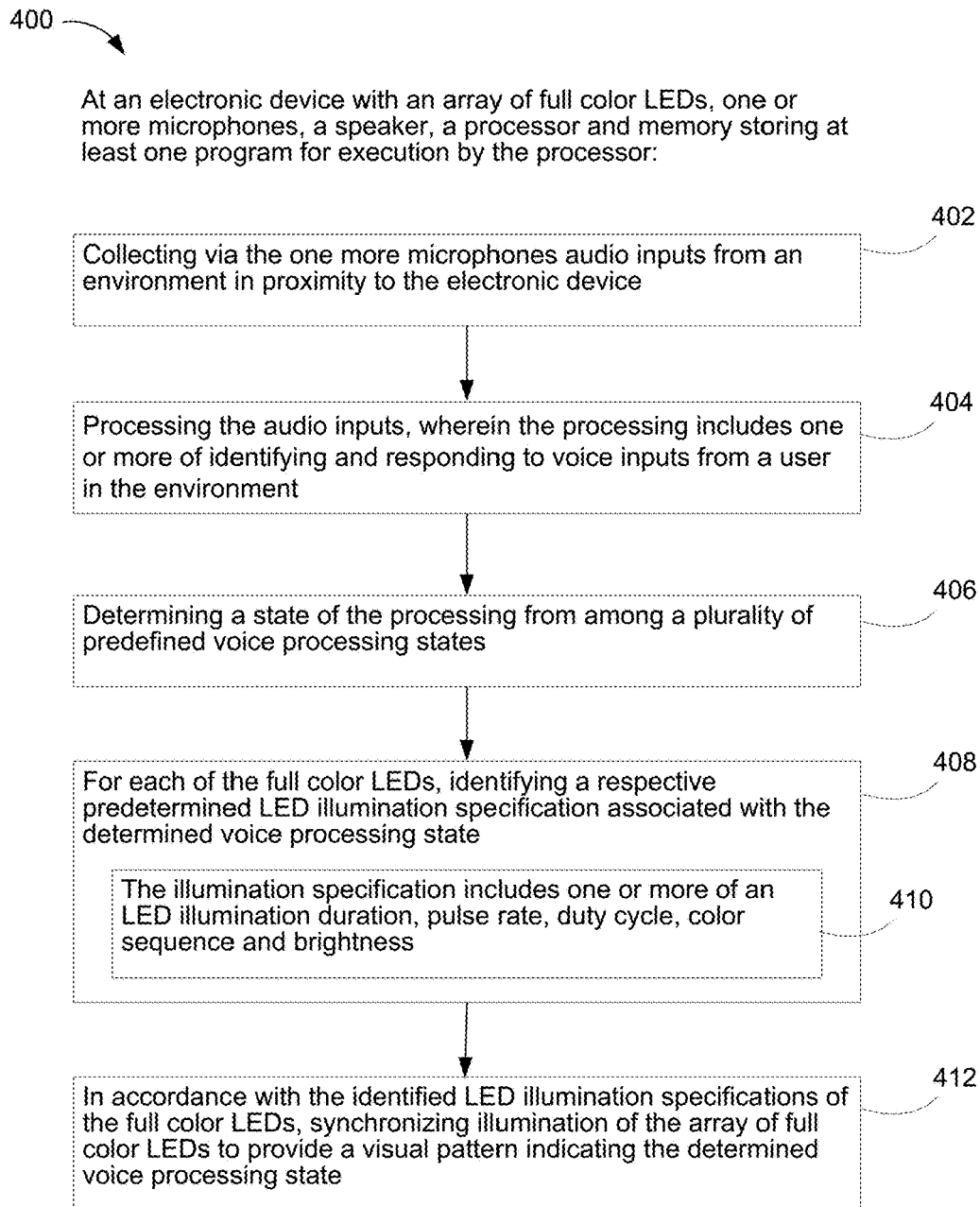
FIG. 4 is a flow diagram illustrating a method of visually indicating a voice processing state in accordance with some implementations.

FIG. 4 is a flow diagram illustrating a method 400 of visually indicating a voice processing state in accordance with some implementations. The method 400 is implemented at an electronic device 190 with an array of full color LEDs, one or more microphones, a speaker, a processor and memory storing at least one program for execution by the processor. The electronic device 190 collects (402) via the one more microphones 402 audio inputs from an environment in proximity to the electronic device 190, and processes (404) the audio inputs. The processing is implemented at voice processing module 522, and includes one or more of identifying and responding to voice inputs from a user in the environment. The electronic device 190 then determines (406) a state of the processing from among a plurality of predefined voice processing states. For each of the full color LEDs, the electronic device 190 identifies (408) a respective predetermined LED illumination specification associated with the determined voice processing state, and the respective illumination specification includes (410) one or more of an LED illumination duration, pulse rate, duty cycle, color sequence and brightness. In accordance with the identified LED illumination specifications of the full color LEDs, the electronic device 190 (specifically, LED control module 524) synchronizes illumination of the array of full color LEDs to provide a visual pattern indicating the determined voice processing state. More details on the method 400 have been explained above with reference to FIGS. 4A-4G and 5.

Method 400 is, optionally, governed by instructions that are stored in a non-transitory computer-readable storage medium and that are executed by one or more processors of a voice-activated electronic device 190. Each of the operations shown in FIG. 4 may correspond to instructions stored in the computer memory or computer-readable storage medium (e.g., memory 306 of the electronic device 190 in FIG. 3). The computer-readable storage medium may include a magnetic or optical disk storage device, solid state storage devices such as Flash memory, or other non-volatile memory device or devices. The computer-readable instructions stored on the computer-readable storage medium may include one or more of: source code, assembly language code, object code, or other instruction format that is interpreted by one or more processors. Some operations in the method 400 may be combined and/or the order of some operations may be changed.

Figure 5:
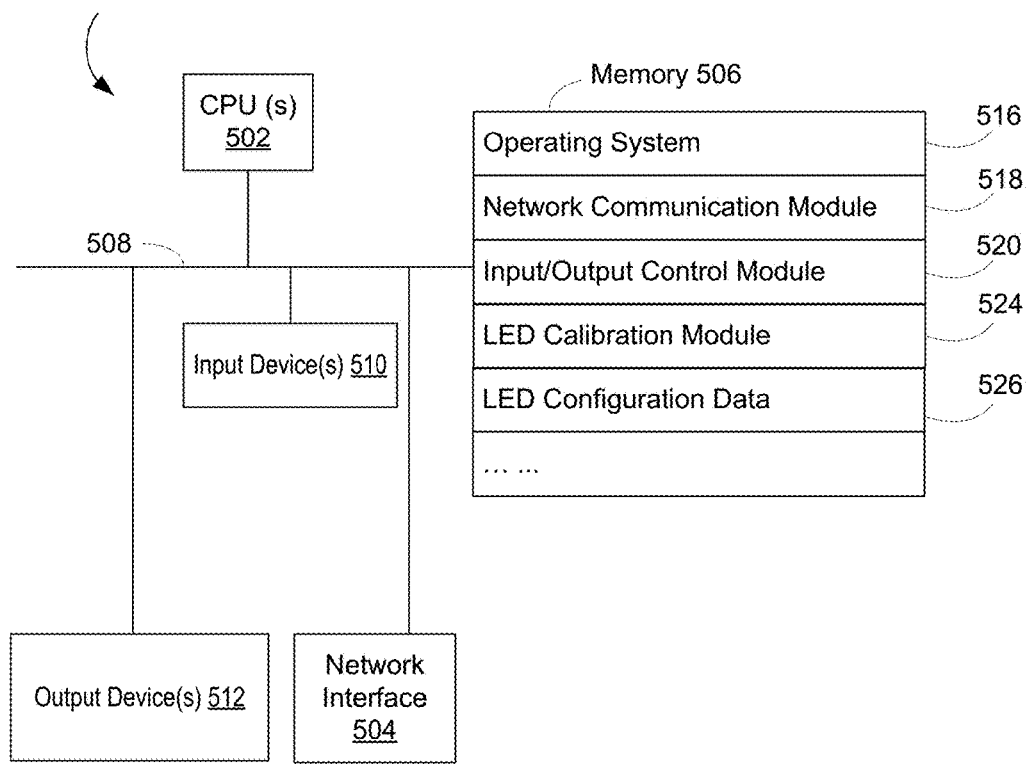
FIG. 5 is a block diagram illustrating an example calibrating device in accordance with some implementations.

FIG. 5 is a block diagram illustrating an example calibrating device 106 in accordance with some implementations. The calibrating device 106, typically, includes one or more processing units (CPUs) 502, one or more network interfaces 504, memory 506, and one or more communication buses 508 for interconnecting these components (sometimes called a chipset). The calibrating device 106 typically also includes one or more input devices 510 that facilitate user input and one or more output devices 512.

Memory 506 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 506, optionally, includes one or more storage devices remotely located from one or more processing units 502. Memory 506, or alternatively the non-volatile memory within memory 506, includes a non-transitory computer-readable storage medium. In some implementations, memory 506, or the non-transitory computer-readable storage medium of memory 506, stores the following programs, modules, and data structures, or a subset or superset thereof:

Operating system 516 including procedures for handling various basic system services and for performing hardware dependent tasks;

Network communication module 518 for communicatively connecting the calibrating device 106 to other devices (e.g., the server system(s), the client device(s), and the like) via one or more network interfaces 504 (wired or wireless) and one or more networks, such as the Internet, other wide area networks, local area networks, metropolitan area networks, and so on;

Input/output control module 520 for receiving inputs via the one or more input devices 510 and enabling presentation of information at the calibrating device 106 via the one or more output devices 512;

LED calibration module 524 for analyzing image information and generating LED calibration information, such as CCM(s); and LED configuration data 526 for use with calibrating LEDs, optionally including de-gamma data, desired LED color values, desired LED brightness values, image sensor color space information, and the like.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 506, optionally, stores a subset of the modules and data structures identified above. Furthermore, memory 506, optionally, stores additional modules and data structures not described above.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method for calibrating light emitting diodes (LEDs), comprising:
   at an electronic device having a processor and memory storing at least one program for execution by the processor:
      obtaining a desired color value for each LED of a plurality of LEDs to be calibrated;
      obtaining image information from an image sensor, the image information corresponding to operation of the plurality of LEDs;
      generating calibration information for each LED of the plurality of LEDs based on the desired color value for the LED and the obtained image information, the calibration information comprising a co or correction matrix for each LED of the plurality of LEDs;
      wherein the generating includes:
         obtaining a color matrix for each LED based on the obtained image information; and
         generating a color correction matrix for each LED based on the obtained color matrix; and
      for at least a subset of the plurality of LEDs, scaling the color correction matrix to prevent overrange of color values for the LED.

2. The method of claim 1, further comprising adjusting one or more operating parameters of each LED of the plurality of LEDs based on the calibration information.

3. The method of claim 2, wherein adjusting the one or more operating parameters of each LED of the plurality of LEDs based on the calibration information including adjusting a brightness parameter for each LED.

4. The method of claim 1, wherein the electronic device includes the plurality of LEDs.

5. The method of claim 1, further comprising sending the calibration information to a second electronic device, the second electronic device including the plurality of LEDs.

6. The method of claim 1, wherein electronic device includes the image sensor.

7. The method of claim 1, wherein each LED of the plurality of LEDs is configured to output light having one or more color components of a plurality of color components; and
   wherein obtaining the image information includes obtaining a plurality of images, each image of the plurality of images capturing a respective color component of the plurality of color components.

8. A non-transitory computer-readable storage medium storing one or more programs, the one or more programs comprising instructions, which when executed by a computing system, cause the system to:
   obtain a desired color value for each LED of a plurality of LEDs to be calibrated;
   obtain image information from an image sensor, the image information corresponding to operation of the plurality of LEDs;
   generate calibration information for each LED of the plurality of LEDs based on the desired color value for the LED and the obtained image information, the calibration information comprising a color correction matrix for each LED of the plurality of LEDs;
   wherein the generating includes:

obtaining a color matrix for each LED based on the obtained image information; and generating a color correction matrix for each LED based on the obtained color matrix; and for at least a subset of the plurality of LEDs, scale the color correction matrix to prevent overrange of color values for the LED.

9. The non-transitory computer-readable storage medium of claim 8, wherein the one or more programs further comprise instructions, which when executed by the computing system, cause the system to:

for each LED of the plurality of LEDs:
store the generated color correction matrix.

10. The non transitory computer-readable storage medium of claim 9, wherein the one or more programs further comprise instructions, which when executed by the computing system, cause the system to, for each LED of the plurality of LEDs, apply the generated color correction matrix to target color output values for the LED.

11. The non-transitory computer-readable storage medium of claim 9, wherein the image information comprises an image capturing a colored-light output of each LED of the plurality of LEDs.

12. A system for calibrating an LED device having one or more LEDs, comprising:

an image sensor configured to capture images of the one or more LEDs;

a calibration container configured to hold the LED device and the image sensor, and configured to prevent outside light from entering an interior of the container; and a calibrating device configured to:
receive the captured images from the image sensor;
generate calibration data for the one or more LEDs based on the received images, the calibration information comprising a color correction matrix for each LED of the one or more LEDs;
wherein the generating includes:
obtaining a color matrix for each LED based on the obtained image information; and
generating a color correction matrix for each LED based on the obtained color matrix; and
for at least one LED of the one or more LEDs, scale the color correction matrix to prevent overrange of color values for the LED; and
send the calibration data to the LED device.

13. The system of claim 12, wherein the calibrating device is further configured to:
prior to calibrating the LED device, obtain image data for the interior of the container; and
adjust one or more operating parameters of the image sensor based on the obtained image data.

14. The system of claim 12, wherein the calibrating device is further configured to:
after sending the calibration data to the LED device, receive one or more additional captured images from the image sensor; and
determine whether to perform an additional correction for the LED device based on an analysis of the one or more additional captured images.

15. The system of claim 12, wherein the calibrating device is further configured to obtain one or more desired color values for each LED of the one or more LEDs; and
wherein generating the calibration data for the one or more LEDs based on the received images includes comparing one or more color values from the received images to the obtained one or more desired color values.

16. The system of claim 12, wherein the image sensor is a component of the calibration device.

17. The system of claim 12, wherein sending the calibration data includes sending a brightness adjustment and or color correction matrix for each LED of the one or more LEDS.

18. The system of claim 12, wherein the image sensor is configured to capture visual data in XYZ color space.

* * * * *

UNITED STATES PATENT AND TRADEMARK OFFICE
CERTIFICATE OF CORRECTION

PATENT NO. : 10,111,296 B2
APPLICATION NO. : 15/717751
DATED : October 23, 2018
INVENTOR(S) : Wu et al.

Page 1 of 1

It is certified that error appears in the above-identified patent and that said Letters Patent is hereby corrected as shown below:

In the Claims

Claim 1, Column 14, Line 21, please delete "a co or correction" and insert --a color correction--;

Claim 3, Column 14, Line 36, please delete "including" and insert --includes--;

Claim 6, Column 14, Line 43, please delete "wherein electronic" and insert --wherein the electronic--;

Claim 17, Column 16, Line 32, please delete "and or" and insert --and/or--;

Claim 17, Column 16, Line 34, please delete "LEDS" and insert --LEDs--.

Signed and Sealed this
First Day of January, 2019

Andrei Iancu
*Director of the United States Patent and Trademark Office*